E. G. BUDD & J. LEDWINKA.
WHEEL.
APPLICATION FILED MAR. 15, 1912.

1,137,458.

Patented Apr. 27, 1915.
2 SHEETS—SHEET 1.

WITNESSES:

INVENTORS

ATTORNEYS

E. G. BUDD & J. LEDWINKA.
WHEEL.
APPLICATION FILED MAR. 15, 1912.
1,137,458.
Patented Apr. 27, 1915.
2 SHEETS—SHEET 2.
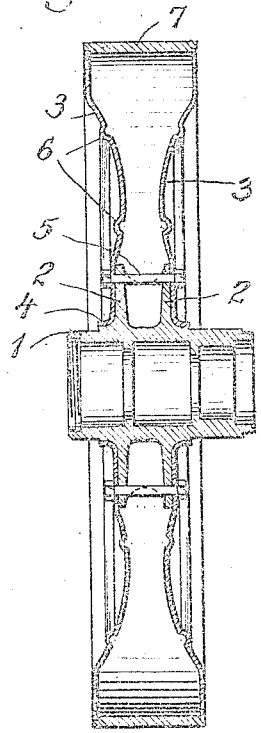
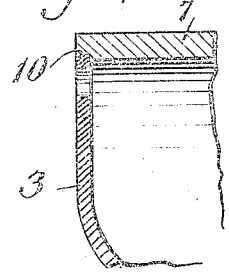
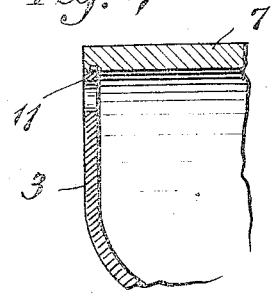
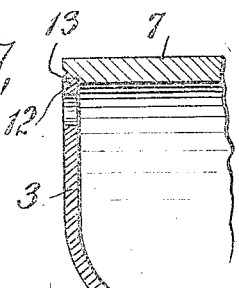
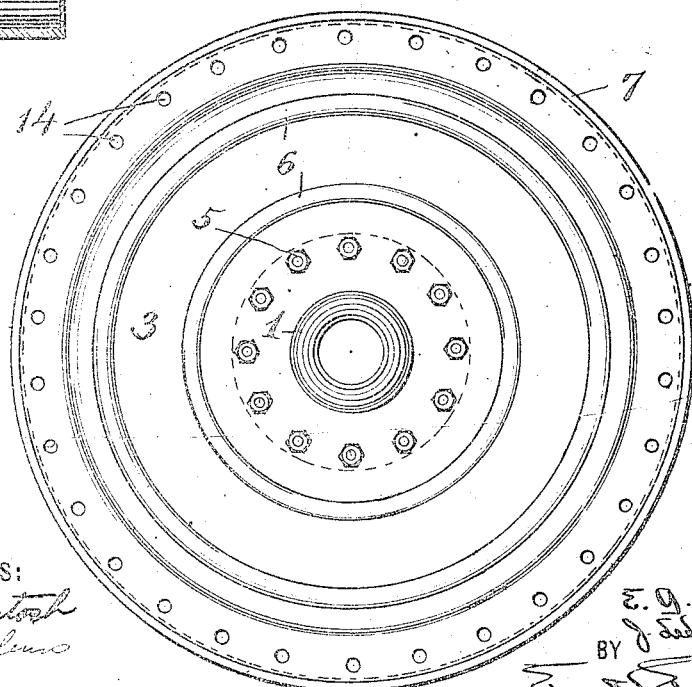
WITNESSES:
INVENTORS
E. G. Budd
J. Ledwinka
BY
ATTORNEYS.

UNITED STATES PATENT OFFICE.

EDWARD G. BUDD AND JOSEPH LEDWINKA, OF PHILADELPHIA, PENNSYLVANIA, ASSIGNORS TO HALE AND KILBURN COMPANY, OF PHILADELPHIA, PENNSYLVANIA, A CORPORATION OF DELAWARE.

WHEEL.

1,137,458.  Specification of Letters Patent.  Patented Apr. 27, 1915.

Application filed March 15, 1912. Serial No. 683,930.

*To all whom it may concern:*

Be it known that we, EDWARD G. BUDD and JOSEPH LEDWINKA, citizens of the United States, residing at Philadelphia, in the county of Philadelphia and State of Pennsylvania, have invented certain new and useful Improvements in Wheels, of which the following is a specification.

This invention relates to wheels for use on vehicles and adapted particularly for use in connection with self-propelled vehicles such as automobile trucks.

The invention is directed to the provision of a wheel for this use made wholly of metal, and the object of the invention is to provide such a metallic wheel which is simple in construction and can therefore be manufactured at low cost, which possesses great strength and which is so constructed as to provide for a limited amount of elasticity, as a result of which the wheel is better able to withstand the hard usage to which it is subjected.

In accordance with the invention, the wheel is built up from a hub of cast metal, two side-plates of sheet metal pressed to the desired configuration and secured parallel one to the other upon the hub, and a rim which is united at its edges to the outer edges of the two side-plates. The two side-plates are so shaped as to provide for a limited amount of elasticity. These side-plates are secured at their inner edges to flanges on the hub and beyond these flanges the plates are curved slightly so that near their outer edges they diverge. The rim is secured to the outer edges of the side-plates in such a manner as will afford great strength at these joints. The rim may be shrunk upon the edges of the side-plates, or the metal at the edges of the rim may be peened over upon the metal of the side-plates, or the edges of the rim and the edges of the two side-plates may be provided with dove-tails for securely uniting them and after these parts have been properly positioned relatively, they may be united by welding. Again, certain of the methods above referred to may be combined as, for instance, by employing the dove-tail joints in combination with the method of securing the rim upon the side-plates by shrinking or by peening. These methods will be hereinafter described in detail.

The preferred embodiment of the invention is illustrated in the accompanying drawings, in which—

Figure 1:
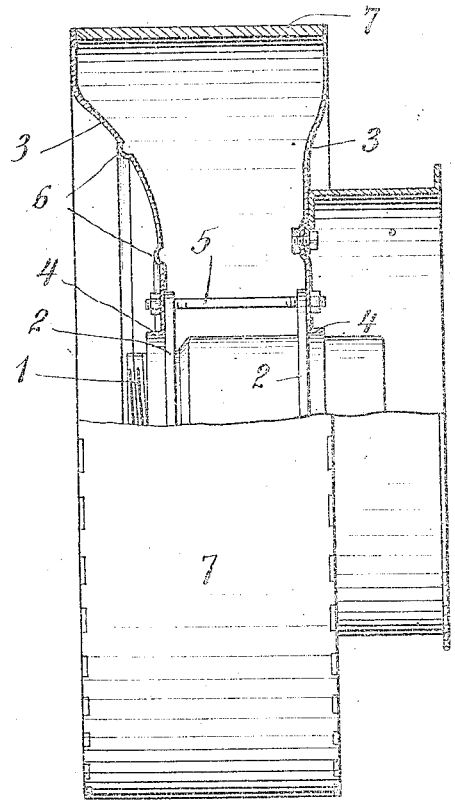
Figure 2:
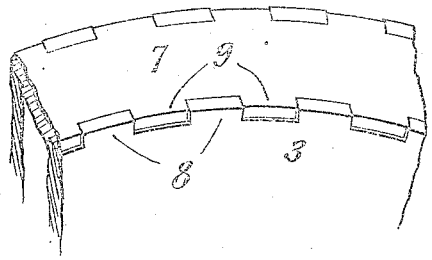
Figure 3:
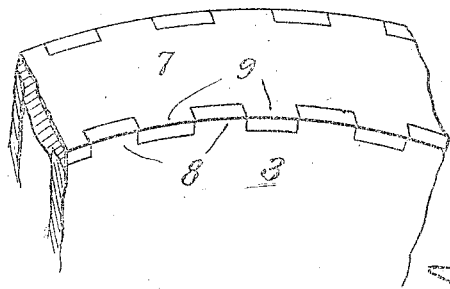

Figure 1 is a sectional elevation of a wheel constructed in accordance with the invention; Figs. 2 and 3 are detail views illustrating one method of joining the rim and side-plates; Fig. 4 is a central section of a wheel; Figs. 5, 6 and 7 are detail views illustrating methods of making the joint between the rim and side-plates; and Fig. 8 is a side view of the completed wheel.

Referring to these drawings, the wheel consists of a hub 1 of cast metal of any desired shape and dimensions, so far as concerns the general configuration and the interior thereof. On this hub are flanges 2 which form supports to which the side-plates of the wheel are secured. Each of these two side-plates is an annulus 3 of sheet metal pressed to the desired shape, preferably that shown in Figs. 1 and 4. At its inner edge, each side-plate is provided with an outwardly directed flange 4. The two side-plates are cold-pressed upon the hub 1, so that they lie close to the non-adjacent sides of the flanges 2 on the hub with the flanges 4 on the side-plates lying close against the body of the hub 1. When in this position, the plates are rigidly secured to the flanges 2 and hub 1 by bolts 5 passing through openings in the plates 3 and flanges 2. Beyond the flange 2, each plate 3 is shaped so that the metal thereof is displaced from the general plane of the plate. By reference to Fig. 4, it will be noted that the two plates converge immediately beyond the flanges 2 and that toward their outer edges, the plates diverge. In both the converging and diverging portions of the plates, beads 6 are preferably provided.

Fig. 1 shows a wheel of substantially heavier construction than that shown in Fig. 4. The wheel shown in Fig. 4 is adapted for use on the front axle of an automobile truck, while that shown in Fig. 1 is adapted primarily for use on the rear axle. The side-plates of the wheel shown in Fig. 1 are dished slightly but the configuration is somewhat different from that shown in Fig. 4; however, the two plates diverge toward their outer edges as in Fig. 4 for the purpose of providing the desired amount of elasticity. A rim 7 consisting of a sheet metal strip bent to the form of a hoop is secured at its lateral edges to the outer edges of the plates 3. In securing rim 7 to the plates 3, each of these parts is preferably provided with dove-tails, as shown in Figs. 1, 2 and 3, the dove-tails on the outer edge of the plates 3 being indicated by the reference 8 and the dove-tails on the rim 7 being indicated by the reference 9.

Fig. 1 shows the rim 7 and the side-plates 3 properly assembled with the dove-tails on these parts holding the parts in proper relative positions. Figs. 2 and 3 illustrate the procedure in securing these parts together. The dove-tails 9 on the rim 7 are initially made of a length slightly less than the thickness of the side-plates 3. Therefore, when the parts are assembled, as shown in Fig. 2, the non-adjacent faces of the side-plates 3 stand slightly beyond the ends of the dove-tails 9. These parts are then clamped together in the clamps of an electric welding machine and while a welding current is being passed through them, they are subjected to high pressure. As a result of this operation, the faces of the disks or side-plates 3 become flush with the edges of the rim 7, that is, with the ends of the dove-tails 9. In this way, these parts are secured together so firmly that a very strong structure is produced, which consists of few parts readily assembled, which can be manufactured at low cost and which, in addition to its great strength, possesses the requisite amount of elasticity.

Referring now to Figs. 5, 6 and 7, alternative methods which may be employed in securing the side-plates and rim together will be described. In Fig. 5 the underside of the rim 7 is shown as provided with grooves adjacent to its lateral edges, each of these grooves having one wall disposed in the general plane of the wheel, and the other wall inclined as shown at 10 in Fig. 5. The side-plates 3 are provided with inclined or beveled peripheral edges shaped to coact with these grooves in the rim 7. With the parts so constructed, the side-plates and rim are assembled in proper relative positions and then the rim is shrunk so that the outer edges of the side-plates enter the grooves in the lateral edges of the rim. Fig. 6 shows a construction quite similar to that illustrated in Fig. 5, the only difference being that the grooves in the rim are differently shaped and the edges 11 of the side-plates are formed to coact with these grooves. It will be seen that both walls of the grooves in the rim lie in the plane of the wheel In Fig. 7, a construction somewhat similar to that shown in the Figs. 5 and 6 is illustrated. Here the rim 7 is provided with grooves at the lateral edges, one wall of which lies in the plane of the wheel and the other wall of which is transverse to that plane. The outer edges of the side-plates 3 are so formed as to correspond in shape to these grooves except that the edges of the side-plates toward the outer sides thereof are beveled as shown at 12. With this construction, the parts are joined by peening rather than by shrinking. It will be seen that the metal of the rim 7 is upset as shown at 13 so as to overlie that edge of the side-plate 3 which is beveled at 12. In the three constructions illustrated in Figs. 5, 6 and 7, it will be seen that an interlock is effected between the side-plates 3 and the rim 7 such that the side-plates cannot be moved one away from the other in such a way as would cause disengagement of one or both of the side-plates from the rim 7.

The method illustrated in any one of Figs. 5, 6 and 7 may, if desired, be combined with that shown in Fig. 3. That is, the dove-tail construction shown in Fig. 3 may be employed and the underside of each dove-tail projection on the rim 7 may be grooved as shown in Figs. 5, 6 or 7; also those portions of the edge of the side-plate 3 which lie between adjacent dove-tails on the side-plate may be formed as shown in Figs. 5, 6 or 7. The structure produced in this way would possess great strength by reason of the employment of the dove-tail construction and this strength would be augmented by the interlock between the side-plates and the rim obtained by the use of one of the constructions shown in Figs. 5, 6 and 7.

Having described our invention, what we claim as new therein and desire to secure by Letters Patent of the United States is:

1. A vehicle wheel comprising a metallic hub, two side plates of pressed sheet metal secured thereon and a sheet metal rim, the edges of said plates and rim being correspondingly notched and interlocked to form dove-tailed joints, and welded together to form an inseparable structure, substantially as set forth.

2. A vehicle wheel comprising a metallic hub, two side plates of pressed sheet metal secured thereon and a sheet metal rim, said rim and side plates being interlocked at their edges and welded together to form an inseparable structure, and said side plates being dished so that they diverge toward their outer edges, and provided with a stiffening bead in the diverging portion, substantially as set forth.

This specification signed and witnessed this 29th day of February, 1912.

EDWARD G. BUDD.
JOSEPH LEDWINKA.

Witnesses:
JOHN P. FLETCHER,
A. B. SHOEMAKER.